Dec. 30, 1958 S. PEDERSEN 2,866,272
CYCLONE HEAT EXCHANGE APPARATUS
Filed Sept. 27, 1955
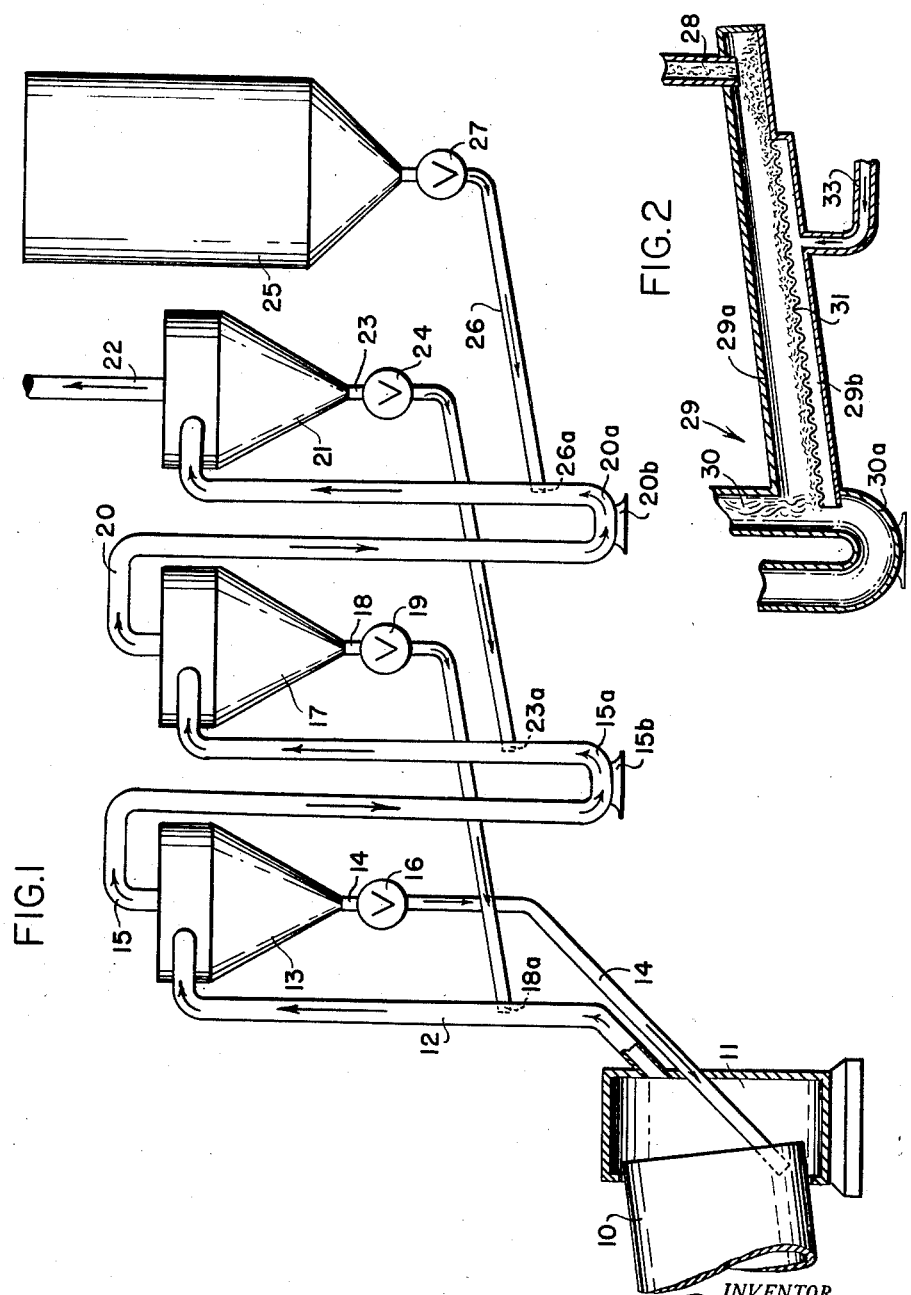
INVENTOR.
Sigurd Pedersen
BY
Pennie Edmonds Morton Barrows Taylor
Attorneys

United States Patent Office 2,866,272
Patented Dec. 30, 1958

2,866,272

CYCLONE HEAT EXCHANGE APPARATUS

Sigurd Pedersen, Copenhagen, Denmark, assignor to F. L. Smidth & Co., New York, N. Y., a corporation of New Jersey Application September 27, 1955, Serial No. 536,975

Claims priority, application France September 28, 1954

5 Claims. (Cl. 34—57)

This invention relates to heat exchange apparatus for heating or cooling pulverulent or granular materials in suspension in gases, the apparatus including a series of cyclone separators with the solid materials separated in one separator introduced into the gas stream passing through the riser pipe leading to the inlet of the preceding separator in the series. More particularly, the invention is concerned with a multi-stage heat exchange apparatus of the kind specified, in which the separators and the container for raw material are disposed at substantially the same level, so that the overall height of the apparatus is relatively small.

Multi-stage heat exchange apparatus, including a plurality of cyclone separators, is frequently used for preheating raw materials to be burned, sintered, or calcined in a kiln with the hot kiln gases utilized as the preheating medium. Similarly, pulverulent materials burned in a kiln may be cooled in a heat exchanger of the multi-stage type, in which event the air used for cooling is preheated and utilized as primary or secondary air for combustion. Heat exchangers, which include a plurality of cyclone separators, have commonly been constructed heretofore with the separators placed one above another, for example, in two rows, and, with such an arrangement, the material separated in one separator may be moved by gravity alone into the riser pipe leading to a separator at a lower level. However, the overall height of such apparatus with the separators placed one above the other may range from 75 to 90 feet or more and such a construction is expensive and space limitations sometimes prevent its use. Also, a heat exchanger of the stated height could not be used as a cooler following a kiln, since its use would require that the kiln be mounted at an intolerably high level.

The present invention is, accordingly, directed to the provision of a heat exchange apparatus, which includes a plurality of cyclone separators but is so constructed that the overall height of the apparatus is little, if any, greater than that of a single separator. The invention is based on the recognition that many pulverulent materials may be conveyed by transport means that are horizontal or only slightly inclined to the horizontal, even when the materials are at high temperatures. In the apparatus of the invention, the separators and the container for the material to be fed are disposed with their outlets at substantially the same level and the riser pipes between successive separators in the series include a bend, which carries the pipe well below the discharge end of the succeeding separator in the series. With this arrangement, the solids separated in one separator, as well as the raw material fed, may be introduced into the riser pipes without difficulty.

For a better understanding of the invention, reference may be made to the accompanying drawings, in which Fig. 1 is a diagrammatic view of a heat exchanger embodying the invention and used for preheating material to be burned in a rotary kiln; and Fig. 2 is a vertical sectional view of conveying means for delivering material separated in one separator into the riser pipe of the preceding separator in the series.

The apparatus of the invention is shown in Fig. 1 in use for preheating material to be burned in a rotary kiln 10 mounted with its upper end extending into a smoke chamber 11. A riser pipe 12 conducts the hot kiln gases from the chamber 11 to the inlet or a cyclone separator 13, which is the first in the series and has an outlet for solids at its bottom and an outlet for gases at its top. A pipe 14 leads from the solids outlet through an opening in the wall of the smoke chamber and into the end of the kiln and the pipe contains a rotary gate valve 16, which permits the solid material to travel therethrough while preventing flow of gases in the reverse direction and into the separator. A pipe 15 leads from the gas outlet of separator 13 to the inlet of a cyclone separator 17 and serves as the riser pipe of that separator. Separator 17 is the second separator, through which the gases from the kiln pass, and it has an outlet for solids at its bottom and a pipe 18 connected to the outlet leads separated solids into the riser pipe 12 of the first separator. Pipe 18 contains a rotary gate valve 19, which is similar in purpose and function to valve 16. A pipe 20 leads from the gas outlet of separator 17 to the inlet of a third separator 21 and serves as the riser pipe of that separator. Separator 21 has a gas outlet, from which a pipe 22 leads to the atmosphere ordinarily through a stack or fan. The separator 21 has an outlet at its bottom for solids, from which a pipe 23 containing a rotary gate valve 24 leads to the interior of the riser pipe 15. The separators 13, 17, and 21 are of substantially the same construction and they are mounted at the same level, so that their solids outlets are at substantially the same level. The riser pipes 15 and 20 of the second and third separators are formed with downward bends 15a, 20a, which extend down below the solids outlets of the three separators.

The raw material to be preheated in the apparatus is supplied from a container, such as a silo 25, having a bottom outlet which lies in substantially the same level as the solids outlets of the separators and from which a pipe 26 containing a rotary gate valve 27 delivers the material into the riser pipe 20. The pipes 18 and 23 leading from the solids outlets of the second and third separators and the pipe 26 leading from the outlet of the silo lead into the riser pipes 12, 15, and 20, respectively, below the level of the solids outlets of the separators and the silo, so that the material can travel through the pipes by gravity.

The apparatus described comprises three separators, but could be constructed with two or more than three separators. Regardless of the number of separators used, the overall height of the apparatus remains substantially the same. The provision of the downward bends in the riser pipes leading to the second, third, and any additional separators makes it possible to introduce the raw material and the material being discharged from a separator into such a riser pipe by gravity without adding to the height of the apparatus. If more than three separators are used, the pipe 26 from the silo conducts the raw material into the riser pipe leading to the last separator in the series and the solids from each separator are introduced into the riser pipe of the preceding separator in the series. In order that the solid material introduced into the riser pipes may be picked up by the gases traveling through the pipes, it may be desirable to reduce the effective cross-section of each riser pipe at the point where the solid material is fed into the pipe. This may be achieved as indicated at 18a, 23a, and 26a by causing the pipes conducting the solid materials to project into the interior of the riser pipes.

In some instances, the slope of a pipe conducting solid material into a riser pipe may be at so low an angle that the material does not flow at the desired rate by gravity alone. In such a situation, the modified form of the apparatus shown in Fig. 2 may be employed. This apparatus includes a pipe 28 leading from the bottom of a cyclone separator or a container for raw material into a pneumatic channel 29, which extends into a riser pipe 30 beyond a bend 30a in the pipe. The channel 29 is made of an upper section 29a and a lower section 29b shorter than the upper section and separated therefrom by a porous diaphragm 31. The material entering the channel through pipe 28 lands upon a non-pervious bottom plate 32 of the upper section 29a of the channel beyond the upper end of the diaphragm. The material accumulates in a pile on the plate and, when the pile has built up to the desired extent, the material delivered through pipe 28 slides down the pile and upon the diaphragm. The pile maintains a body of material within the pipe 28 acting as a seal between the channel and the separator, from which the pipe 28 leads. Compressed air is admitted into the space below the diaphragm through a pipe 33 and the air passing through the diaphragm fluidizes the material thereon, so that the latter travels down the diaphragm and enters the riser pipe 30. The lower section 29b of the channel extends into the riser pipe to cut down the effective cross-section thereof and increase the speed of the gas traveling through the riser pipe at the point where the material enters the pipe.

The raw material supplied to the apparatus and that separated in the separator 21 may contain lumps too large to be carried in suspension by the gas stream and the riser pipes 15 and 20. In order to permit removal of these lumps, the pipes may be provided with discharge ports 15b, 20b, respectively, at the bottom of their bends, through which the lumps may be periodically removed.

When the heat exchange apparatus of the invention is used as a cooler for cooling material burned in a kiln, the kiln corresponds to the container 25 for material to be treated and a pipe leads from the lower end of the kiln into the riser pipe of the last separator in the series. Atmospheric air is led by a riser pipe to the inlet of the first separator and solids separated in the next separator in the series are conducted into the air stream traveling through the riser pipe. The solids separated in the first separator are led through a pipe corresponding to pipe 14 to a discharge point, while the heated gas leaving the last separator is fed by a pipe corresponding to pipe 22 to the kiln burner or directly into the kiln. In other respects, the apparatus is the same as that illustrated and described above.

In the drawing, the heat exchange apparatus is illustrated as including three separators and a silo or other container arranged in alignment, but it is to be understood that any other disposition of the separators and silo can be used, as desired. Thus, the three separators may be disposed at the corners of a triangle with the silo outside or inside the triangle or the separators and silo may be arranged in a square or in any other formation, which space limitations at the place of installation may require.

I claim:

1. Apparatus for preheating pulverulent material to be burned in a rotary kiln by waste gases from the burning operation, which comprises at least two cyclone separators each having an inlet and separate outlets for gas and solids, a riser pipe connected to the upper end of the kiln to receive hot waste gases therefrom and to conduct the gases to the inlet of the first separator, a pipe for conducting separated solids from the solids outlet of the first separator to the upper end of the kiln to be burned therein, means including a pipe connected to the gas outlet of the second separator, for conducting gas from the second separator out of the apparatus, a riser pipe leading to the inlet of the second separator from the gas outlet of the first separator, a pipe for conducting material from the solids outlet of the second separator into the riser pipe leading to the inlet of the first separator, a container for fresh pulverulent material having an outlet at its lower end and means, including a pipe connected to the container outlet, for conducting material from the container into the riser pipe leading to the inlet of the second separator, the upper ends of the separators lying at substantially the same upper level, the solids outlets from the separators and the outlet from the container lying at substantially the same intermediate level, and the riser pipes having sections at a level lower than the outlets, the pipes for conducting material discharging into said sections of the riser pipes.

2. The apparatus of claim 1, in which the effective cross-section of at least one of the riser pipes is reduced at the place where the solid materials are introduced into the gas stream flowing through the pipe.

3. The apparatus of claim 1, in which at least one of the pipes for conducting solid material into a riser pipe is of so low a slope that the material would not flow therethrough at the desired rate and the conducting pipe is provided with means for supporting and introducing air into the material to render it fluent.

4. The apparatus of claim 3, in which the aerating means includes a porous diaphragm for supporting the material and means for diffusing air through the diaphragm into the material.

5. The apparatus of claim 4, in which the diaphragm extends from the discharge end of the pipe and terminates short of the other end, and the pipe has an opening for admission of material lying beyond the upper end of the diaphragm, whereby material entering the opening forms a pile lying upwardly from the diaphragm and closing the opening.

References Cited in the file of this patent

UNITED STATES PATENTS

| | | |
|---|---|---|
| 1,577,534 | Miller | Mar. 23, 1926 |
| 1,733,022 | Koon | Oct. 22, 1929 |
| 1,934,410 | Cummins | Nov. 7, 1933 |
| 2,068,077 | Rosin et al. | Jan. 19, 1937 |
| 2,132,656 | Smith | Oct. 11, 1938 |
| 2,189,099 | Bennett | Feb. 6, 1940 |
| 2,235,683 | Horesi | Mar. 18, 1941 |
| 2,534,728 | Nelson | Dec. 19, 1950 |